(12) United States Patent
Kmiecik et al.

(10) Patent No.: US 8,280,107 B2
(45) Date of Patent: Oct. 2, 2012

(54) METHOD AND APPARATUS FOR IDENTIFICATION AND POSITION DETERMINATION OF PLANAR OBJECTS IN IMAGES

(75) Inventors: Marcin Michal Kmiecik, Lodz (PL); Arkadiusz Wysocki, Lodz (PL)

(73) Assignee: Tomtom Global Content B.V., Amsterdam (NL)

( * ) Notice: Subject to any disclaimer, the term of this patent is extended or adjusted under 35 U.S.C. 154(b) by 515 days.

(21) Appl. No.: 12/311,470

(22) PCT Filed: Nov. 5, 2007

(86) PCT No.: PCT/NL2007/050537
§ 371 (c)(1),
(2), (4) Date: Oct. 19, 2009

(87) PCT Pub. No.: WO2008/054217
PCT Pub. Date: May 8, 2008

(65) Prior Publication Data
US 2010/0166256 A1 Jul. 1, 2010

(30) Foreign Application Priority Data
Nov. 3, 2006 (WO) ............... PCT/NL2006/050277

(51) Int. Cl.
*G06K 9/00* (2006.01)
(52) U.S. Cl. ........ 382/103; 382/154; 382/108; 382/100; 348/42; 348/47
(58) Field of Classification Search .................. 382/154, 382/103, 108, 100; 348/42, 47
See application file for complete search history.

(56) References Cited

U.S. PATENT DOCUMENTS
7,233,691 B2 * 6/2007 Setterholm .................. 382/154

FOREIGN PATENT DOCUMENTS
| JP | 2003519421 A | 6/2003 |
| WO | 0148683 A | 7/2001 |
| WO | WO 01/48683 | 7/2001 |

OTHER PUBLICATIONS
International Search Report issued Jun. 19, 2008 for International Application No. PCT/NL2007/05037.

* cited by examiner

*Primary Examiner* — Matthew Bella
*Assistant Examiner* — Ruiping Li

(57) ABSTRACT

A method of identifying a planar object in source images is disclosed. In at least one embodiment, the method includes: retrieving a first source image obtained by a first terrestrial based camera; retrieving a second source image obtained by a second terrestrial based camera; retrieving position data associated with the first and second source image; retrieving orientation data associated with the first and second source image; performing a looking axis rotation transformation on the first and second source image by use of the associated position data and orientation data to obtain first and second intermediate images, wherein the first and second intermediate images have an identical looking axis; performing a radial logarithmic space transformation on the first and second intermediate images to obtain first and second radial logarithmic data images; detecting an area in the first image potentially being a planar object; comparing the potential planar object having similar dimensions in the second radial logarithmic data image and similar rgb characteristics; and finally, identifying the area as a planar object and determining its position. At least one embodiment of the method enables the engineer to detect very efficiently planar perpendicular objects in subsequent images.

9 Claims, 10 Drawing Sheets

$$\frac{z\text{-dist}}{z} = \frac{R_1}{R_2} = \frac{W_1}{W_2} = \frac{H_1}{H_2}$$

METHOD AND APPARATUS FOR IDENTIFICATION AND POSITION DETERMINATION OF PLANAR OBJECTS IN IMAGES

FIELD OF THE INVENTION

The present invention relates to a method of identifying a planar object in source images. The invention further relates to an apparatus for identifying and determining the position of a planar object from source images for use in a map database.

PRIOR ART

There is a need to collect a large number of "vertical" road information e.g. road signs, speed limits, direction signposts, bill boards etc. for digital map databases used in navigation systems and the like. The term "vertical" indicates that an information plane of the road information is generally parallel to the gravity vector. The vertical road information, e.g. STOP on a stop sign, is normally written on a planar sign, usually a metallic plate mounted on a post. Therefore, a characteristic of "vertical road information" is that they could be extracted from a planar plane. Nowadays, vertical road information can be obtained by analysing and interpreting vertical picture images and other data collected by a mobile collection device. Mobile mapping vehicles which are terrestrial based vehicles, such as a car or van, are used to collect mobile data for enhancement of digital map databases. Examples of enhancements are the location of traffic signs, route signs, traffic lights, street signs showing the name of the street, exit signs, etc. The geo-spatial location of these objects can be added to the map databases, the location of these objects within the imagery can also be further used to extract the information presented on the sign.

The mobile mapping vehicles have a number of cameras, some of them stereographic. The cameras are accurately geo-positioned as a result of the van having precision GPS and other position and orientation determination equipment onboard. While driving the road network, image sequences are being captured.

The mobile mapping vehicles record more than one image sequence of the object, e.g. a sign or a building or a road surface, and for each image of an image sequence the geo-position is accurately determined together with the orientation data of the image sequence. Image sequences with corresponding geo-position information will be referred to as geo-coded image sequences. The position and orientation data is stored as metadata associated with each source image. Other data may also be collected by other sensors, simultaneously and similarly geo-coded.

The analysis of the image sequences is very time consuming and cost a lot of processing power due to the vast amount of data to be processed.

For modern map database application it is important to have the roadside signs and corresponding accurate position information. One way to capture roadside sign information is to use a camera mounted on a mobile mapping vehicle equipped with an accurate position determination system. A stereo pair of cameras is used to get the position information. However, such a system has difficulties in getting adequate image coverage as the vehicle moves closer to the signs. Such a system also needs complex algorithms and a lot of processing power to analyse the stereo pair of images.

SUMMARY OF THE INVENTION

The present invention seeks to provide an improved method of identifying automatically a planar object in source images.

According to the present invention, the method comprises:
retrieving a first source image obtained by a first terrestrial based camera;
retrieving a second source image obtained by a second terrestrial based camera;
retrieving position data associated with the first and second source images;
retrieving orientation data associated with the first and second source images;
performing a combined looking axis rotation transformation and radial logarithmic space transformation on at least a part of the first and second source images by means of the associated position data and orientation data to obtain first and second radial logarithmic data images, wherein the looking axis rotation transformation corresponds to transforming the first and second source images into first and second intermediate images representing images having an identical looking axis;
detecting an area having similar dimensions in the first and second radial logarithmic data images; and
identifying the area as a planar object.

The invention is based on the recognition that when a camera is moved along its looking axis the length and width of a stationary object in images captured by the camera changes inversely proportional to the distance between the focal point of the camera and the object, for example when the distance to the object halves the height of the object will double. By movement of the camera, the object travels along straight lines in the images space. That is any pixel in the object will travel its exact straight line in the image space. In other words, movement of the camera corresponds to zooming in or out on the object. This characteristic only applies for planar objects with a plane almost perpendicular to the looking axis of the camera. Any object not being planar, has points that are not at the same depth. Due to the different depth, the travel speed along the straight line in image space will differ. This results in deformation of the object in the image space.

A mobile mapping vehicle which drives over the surface of the earth, records surface collected geo-positioned image sequences with terrestrial based cameras. Some of said images include planar vertical objects in front of the vehicle along the side of the road. However, even on a road straightaway, the camera is not moved along its looking axis. The position and orientation of the camera with respect to the vehicle is known, and the position and orientation of the vehicle is accurately known with respect to a geographic coordinate reference system, including the gravity vector because of the accurate position and orientation sensors integrated into the mobile mapping vehicle. Then by means of trigonometry, the source images can be transformed into images which represent images that have been captured by moving a camera along the looking axis. When a radial logarithmic space transformation is performed on said images a straight line starting from the looking axis in image space is transformed to a straight horizontal line in radial logarithmic space. From the above, we have learned that pixels of an object having a planar surface which is perpendicular to the looking axis will travel its exact straight line in the image space. Consequently, said object will have similar size and shape in the radial logarithmic images. This feature enables the engineer to perform a simple matching algorithms on two images to detect areas in said images having objects with similar size and characteristics. The detected areas correspond to objects having a planar surface approximately perpendicular to the looking axis of the first and second intermediate images.

The present invention uses simple and efficient processes to obtain images wherein planar objects have similar dimensions, which enables the engineer to use relatively simple pattern matching algorithms to detect the planar objects in said images. After finding the planar objects, only the areas corresponding to the planar objects have to be analyzed to identify the characteristics of the planar object, e.g. the type of road sign, or the directions on a sign post. By use of the invention, the processing power to capture planar objects from the image sequences can be reduced significantly over that of the prior art.

In a further embodiment of the invention the method further comprises
  detecting a part of the first source image or first intermediate image corresponding to a potential planar object; wherein the first radial logarithmic data image has been obtained by performing a logarithmic space transformation on the part of the first intermediate image corresponding to the potential planar object and the second radial logarithmic data image has been obtained by performing a logarithmic space transformation on a part of the second intermediate image, wherein said part is defined by the position of the looking axis in the second intermediate image and the corresponding part of the first intermediate image corresponding to the potential planar object. These features reduce the amount of image data to be processed. First the potential areas of planar objects in a source image or looking axis transformed image are determined. Then for each area a corresponding first radial logarithmic space image is generated and a second radial logarithmic space image corresponding to the part of the second intermediate image where the potential planar object could be present is also generated. Furthermore, only the relatively small first and second radial logarithmic data images have to be analyzed to detect and identify the planar object.

In a further embodiment of the invention, the looking axis of the first and second intermediate image is parallel to a horizontal plane. This feature enables the engineer practicing the invention to detect planes parallel to the gravity vector. This is very suitable to detect vertical road information as e.g. road signs and direction signposts, are normally positioned straight up, which means parallel to the gravity vector.

In an embodiment of the invention, properties of an identified planar object in the first and second intermediate images satisfy the following equation:

$$\frac{R_1}{R_2} = \frac{W_1}{W_2} = \frac{H_1}{H_2}$$

wherein:
  $R_1$=distance between position of looking axis and position of object in first intermediate image;
  $R_2$=distance between position of looking axis and position of object in second intermediate image;
    $W_1$=width of object in first intermediate image;
    $W_2$=width of object in second intermediate image;
    $H_1$=height of object in first intermediate image;
    $H_2$=height of object in second intermediate image.
  These features enable us to verify whether a surface of an identified object is perpendicular to the looking axis.

Given a simple perspective equation for the object in the first intermediate image in place one can observe that:

$$\frac{f}{z} = \frac{x_1}{x}, \frac{f}{z} = \frac{y_1}{y}, R_1 = \sqrt{x_1^2 + y_1^2}$$

Wherein:
f=focal length of the camera
z=distance from plane object to camera
y=height of object above looking axis of camera
x=side distance to object to looking axis of camera
x1=distance over x axis from object to looking axis in first image
y1=distance over y axis from object to looking axis in first image
$R_1$=distance between position of looking axis and position of object in first intermediate image;
therefore $$\frac{f}{z} = \frac{R_1}{\sqrt{x^2 + y^2}}$$

Similarly, for the object in the second intermediate image one can derive:

$$\frac{f}{z - dist} = \frac{R_2}{\sqrt{x^2 + y^2}}$$

wherein:
  dist=distance between position of the focal point of first intermediate image and second intermediate image.

In an embodiment of the invention, the detecting action comprises:
  perform a pattern matching algorithm to detect similar areas in the first and second radial logarithmic data image. Due to the characteristics of the radial logarithmic space transformation there is no need to scale the images and is it possible to search in the first and second radial logarithmic data image for similar areas.

In a further embodiment of the invention, the pattern matching algorithm comprises:
  segmenting the first radial logarithmic data image into segments to obtain an area of a potential planar object;
  perform a scan algorithm with the area of a potential object to detect a similar area in the second radial logarithmic data image.

These features enables us to process efficiently the data images. Commonly known segmentation algorithms can be used to segment an image into areas. A property of the radial logarithmic space transformation is that a stationary planar object has a similar position in such images with respect to the angle axis and has different positions with respect to the radial logarithmic axis. Therefore, a scan algorithm can be used to efficiently find an area in the second radial logarithmic data image that is similar to the area of the potential planar object found in the first radial logarithmic data image. The area of the first image has to be shifted only along the radial logarithmic axis of the second image to find a matching area.

In an embodiment of the invention performing the scan algorithm comprises:
  determining the horizontal displacement of the area of a potential planar object with minimal difference of the rgb distance between the area of a potential object of the first radial logarithmic image and the second radial logarithmic image; and the method further comprises:

computing the position of the planar object in dependence of the horizontal displacement, the position and orientation data. This feature enables us to detect a similar area in the radial logarithmic images and by measuring the horizontal displacement of the two areas, determine accurately the position of the area with respect to the camera.

In a further embodiment of the invention performing the scan algorithm further comprises:

dividing the area of a potential object into at least two parts;

determining the horizontal displacement of each of the at least two parts with minimal difference of the rgb distance between the area of a part in the first radial logarithmic image and the second radial logarithmic image;

verifying whether the horizontal displacement of each of the at least two parts is similar. These features enables us to have an additional test to verify the perpendicularity of a potential object.

In a further embodiment of the invention an area is identified as a planar object if the minimal difference of the rgb distance between the area of a potential object of the first radial logarithmic image and the second radial logarithmic image is smaller than a predefined threshold. This feature enables us to reduce further the number of false positives, by verifying whether there area's have the desired degree of similarity.

In an embodiment of the invention computing the position of the planar object performs the equation:

$$z = -\frac{dist}{e^{offset \frac{log(width)}{log(e)width}} - 1}$$

where:

z—distance between focal point of camera and intersection of looking axis and plane corresponding to planar object in second intermediate image, width—log space image width, dist—distance between two camera positions in real world, offset—horizontal displacement between object locations in radial logarithmic image space. These features enable us to determine the distance between the camera and the object.

The present invention can be implemented using software, hardware, or a combination of software and hardware. When all or portions of the present invention are implemented in software, that software can reside on a processor readable storage medium. Examples of appropriate processor readable storage medium include a floppy disk, hard disk, CD ROM, DVD, memory IC, etc. When the system includes hardware, the hardware may include an output device (e.g. a monitor, speaker or printer), an input device (e.g. a keyboard, pointing device and/or a microphone), and a processor in communication with the output device and processor readable storage medium in communication with the processor. The processor readable storage medium stores code capable of programming the processor to perform the actions to implement the present invention. The process of the present invention can also be implemented on a server that can be accessed over telephone lines or other network or interne connection.

It should be noted that WO01048683A1 teaches a method wherein recorded images having an overlapping scene could be transformed into a Qualitative Cyclispheric Stereo Pair (QCSP) of images. A transform similar to the radial logarithmic space transformation generates a "radial" stereo pair. This transformation does only work well if the images are aligned with the direction of travel, i.e. pointing in the direction of travel. WO01048683A1 does not disclose a method wherein images which are not aligned with the direction of travel could be used to obtain a "radial" stereo pair of images which comprises the desired characteristics to allow less complex image recognition algorithms. Furthermore, said document does not teach that the position of objects with respect to the camera could be determined from such a "radial" stereo pair.

SHORT DESCRIPTION OF DRAWINGS

The present invention will be discussed in more detail below, using a number of exemplary embodiments, with reference to the attached drawings, in which FIG. 1. shows a flow diagram of an embodiment of the invention;

DETAILED DESCRIPTION OF EXEMPLARY EMBODIMENTS

Figure 14:
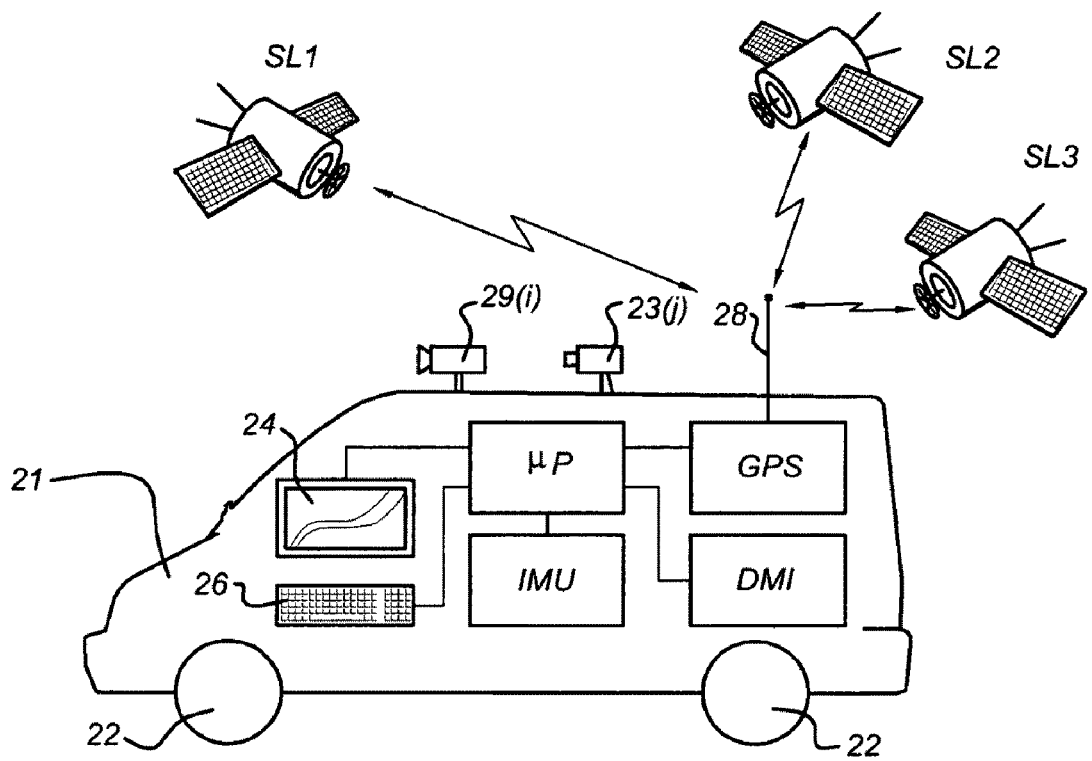
FIG. 14 shows a MMS system with a camera.

FIG. 14 shows a MMS system that takes the form of a van 21. The van 21 is provided with one or more cameras 29(*i*), i=1, 2, 3, . . . I and one or more laser scanners 23(*j*), j=1, 2, 3, . . . J. The looking angle or the one or more cameras 29(*i*) can be in any direction with respect to the driving direction of the van 21 and can thus be a front looking camera, a side looking camera or rear looking camera, etc. The viewing window(s) of the camera(s) 29(*i*) cover(s) the whole road surface in front the vehicle. Preferably, the angle between the driving direction of the van 21 and the looking angle of a camera is within the range of −45 degree −45 degree on either side. The van 21 can be driven by a driver along roads of interest.

The van 21 is provided with a plurality of wheels 22. Moreover, the van 21 is provided with a high accuracy position determination platform. As shown in FIG. 14, the position determination platform comprises at least some of the following components:

a GPS (global positioning system) unit connected to an antenna 28 and arranged to communicate with a plurality of satellites SLi (i=1, 2, 3, . . . ) and to calculate a position signal from signals received from the satellites SLi. The GPS unit is connected to a microprocessor μP. Based on the signals received from the GPS unit, the microprocessor μP may determine suitable display signals to be displayed on a monitor 24 in the van 21, informing the driver where the van is located and possibly in what direction it is traveling. Instead of a GPS unit a differential GPS unit could be used. Differential Global Positioning System (DGPS) is an enhancement to Global Positioning System (GPS) that uses a network of fixed ground based reference stations to broadcast the difference between the positions indicated by the satellite systems and the known fixed positions. These stations broadcast the difference between the measured satellite pseudoranges and actual (internally computed) pseudoranges, and receiver stations may correct their pseudoranges by the same amount.

- a DMI (Distance Measurement Instrument). This instrument is an odometer that measures a distance traveled by the van 21 by sensing the number of rotations of one or more of the wheels 22. The DMI is also connected to the microprocessor μP to allow the microprocessor μP to take the distance as measured by the DMI into account while calculating the display signal from the output signal from the GPS unit.
- an IMU (Inertial Measurement Unit). Such an IMU can be implemented as three gyro units arranged to measure rotational accelerations and translational accelerations along three orthogonal directions. The IMU is also connected to the microprocessor μP to allow the microprocessor μP to take the measurements by the DMI into account while calculating the display signal from the output signal from the GPS unit. The IMU could also comprise dead reckoning sensors.

It will be noted that one skilled in the art can find many combinations of Global Navigation Satellite systems and onboard inertial and dead reckoning systems to provide an accurate location and orientation of the vehicle and hence the equipment (which are mounted with know positions and orientations with references to a reference position and orientation of the vehicle).

The system as shown in FIG. 14 is a so-called "mobile mapping system" which collects geographic data, for instance by taking pictures with one or more camera(s) 29($i$) mounted on the van 21. The camera(s) 29($i$) are connected to the microprocessor μP. The camera(s) 29($i$) in front of the van could be a stereoscopic camera. The camera(s) could be arranged to generate an image sequence wherein the images have been captured with a predefined frame rate. In an exemplary embodiment one or more of the camera(s) are still picture cameras arranged to capture a picture every predefined displacement of the van 21 or every interval of time. The camera(s) 29($i$) send the images to the μP. In an embodiment, the mobile mapping vehicle comprises three cameras, one front looking camera and a camera at each side having a looking axis within a range of 30-60 degree and preferably 45 degree, with respect to the heading direction of the vehicle. In that case, the front looking camera captures images especially suitable for detecting road directions above the road surface and the side looking cameras captures images especially suitable for detecting objects, such as road signs, along the road.

It is a general desire to provide as accurate as possible location and orientation measurement from the three measurement units: GPS, IMU and DMI. These location and orientation data are measured while the camera(s) 29($i$) take pictures. The pictures are stored for later use in a suitable memory of the μP in association with corresponding location and orientation data of the van 21, collected at the same time these pictures were taken. The pictures include visual information, for instance, as to building blocks, to trees, traffic signs, parked cars, people, direction signposts, etc.

Figure 15:
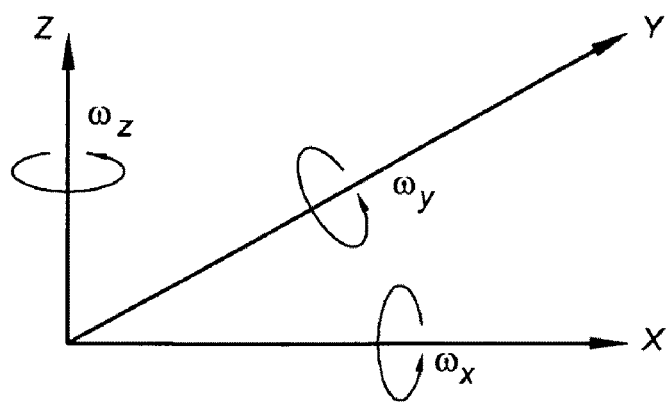
FIG. 15 shows a diagram of location and orientation parameters.

FIG. 15 shows which position signals can be obtained from the three measurement units GPS, DMI and IMU shown in FIG. 14. FIG. 15 shows that the microprocessor μP is arranged to calculate six different parameters, i.e., three distance parameters x, y, z relative to an origin in a predetermined coordinate system and three angle parameters $\omega_x$, $\omega_y$, and $\omega_z$, respectively, which denote a rotation about the x-axis, y-axis and z-axis respectively. Preferably, the z-direction coincides with the direction of the gravity vector. The global UTM or WGS84 coordinate system could be used as predetermined coordinate reference system. It should be noted that the method according to the invention can be used with a local coordinate reference system, such as NAD 83 and other national grid systems. The six different parameters provide the 6-degree of freedom which is needed to track the position and orientation of the vehicle in time. The camera(s) and laser scanners have a fixed position and orientation with respect to a reference position and orientation on the van 21 or position determination platform. This enables us to determine accurately from the six parameters the position of each laser sample in the coordinate reference system and the position and orientation of the camera in the coordinate reference system at the moment of taking an image.

The method according to the invention relates to detecting road signs, direction signposts and other planar objects. These objects are stationary and usually have a planar surface which is perpendicular to the axis of a road, with road information written on said planar surface. Generally, the axis of the road is horizontal and in the direction of the traffic flow. It has been found that road signs are not exactly placed perpendicular to the road axis but are rotated approximately 5 degrees towards the road such that a driver driving on the road will have an almost perpendicular view on the road sign. Further this small rotation improves the visibility in night as the planar surface will better reflect the light of the vehicle to the driver.

Figure 1:
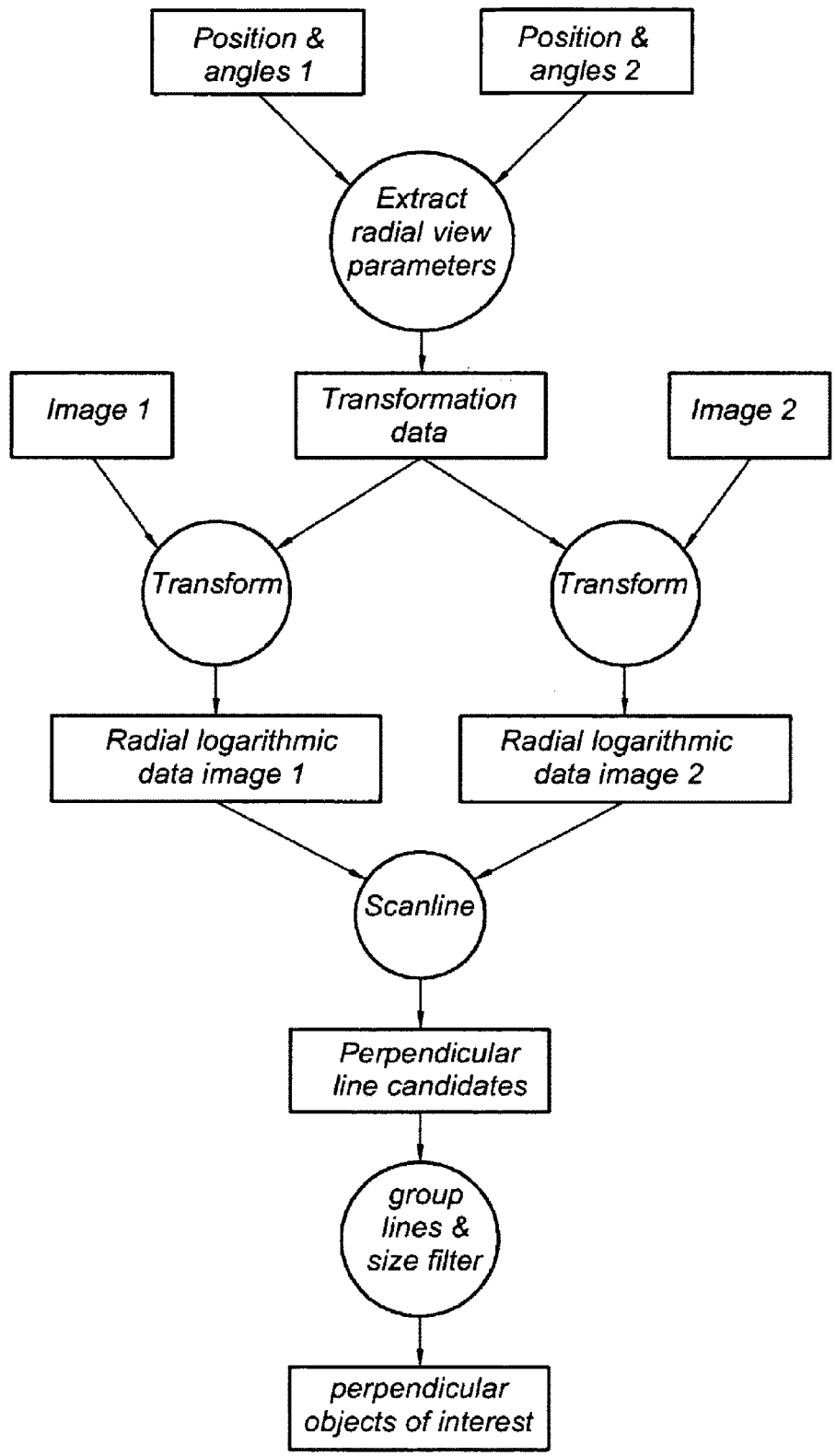

A transformation will be disclosed which transforms an object, visible in two images, obtained from different locations and with different looking axes, into objects with similar size and shape, visible in the transformed images FIG. 1 shows a flow diagram of the process of the invention. Input signals of the transformation, which is a combined looking axis rotation and radial logarithmic space transformations, are the first image and the second image and the position and orientation of the camera at the instant of capturing the first and second images. The orientation is representative of the angle of the looking axis of the camera with respect to a reference orientation. In an embodiment, the reference orientation corresponds to the heading direction of the mobile mapping vehicle or positioning determining platform. The source images represent more or less vertical images which are recorded by a terrestrial based camera. The source images could be a sequence of still pictures recorded by means of a still picture camera, which camera is triggered every displacement of e.g. 10 meters. A camera comprising the image sensor has an angle of view α. The angle of view α is determined by the focal length of the lens combination of the camera. The angle of view a could be in the range of 45°<α<90°. Furthermore, the camera has a looking axis, which is in the centre of the angle of view. The camera looking axis is parallel to a horizontal plane, for example the road surface. Normally, the image sensor is mounted perpendicular to the looking axis. In this case, the image sensor records "pure" vertical source images. Further the height of the image sensor is known with respect to the horizontal plane, e.g. the earth surface. By means of trigonometry the geo-coded source image retrieved from the terrestrial based camera can be converted to any virtual plane. Even if the looking axis is angled with a known angle with respect to the horizontal plane, the virtual plane can be obtained from a source image.

An image taken by a still picture camera is a representation of the colors of the nearest surface points that are in view of the camera. The value of a pixel corresponds to the color of the surface that will be seen from the focal point of the camera via the light sensitive element of the image sensor measuring the color for said pixel. Typically lenses used in today's cameras have resolutions and focal lengths that give a picture with an angular resolution at about 0.01-0.1 degrees per pixel.

A mobile mapping vehicle is equipped with a positioning platform comprising positioning sensors, e.g. a GPS-receiver and possibly additional inertial and dead reckoning sensors, and orientation sensors, e.g. gyroscopes, accelerometers and a distance measurement unit. These sensors are commonly known. With these sensors the position and orientation of the vehicle can be determined very accurately and recorded. Furthermore, the mobile mapping vehicle is equipped with a number of cameras to record images sequences. Two cameras could be mounted in front of the car to record the images in front of the vehicle. These two cameras can be arranged to generate a sequence of stereoscopic image pairs. Furthermore, cameras could be mounted at the left and right side to obtain side views from the car and the camera at the rear of the vehicle to record the living world seen from the rear of the vehicle. If cameras are mounted on all sides of the vehicle a continuous, or near continuous, view in all directions around the vehicle could be obtained. A camera in front and at the rear enables us to obtain two images sequences of the same road but from opposite directions.

All the recorded data sources, comprising at least the positioning and orientation data and image sequences, use the same time reference. The positioning platform enables us to determine very accurately the position and orientation of the mobile mapping vehicle in a coordinate reference system. An accurate position and orientation of the camera can be derived from the data from the positioning platform and the fixed position and orientation of the respective camera with respect to the determined position and orientation of the positioning platform. The position could be an accurate absolute position or at least an accurate relative position. The first and second image could be obtained from two camera's mounted at two different locations of the moving vehicle or two subsequent images of the image sequences. Preferably, the first and second images are captured by the same still picture camera, wherein the distance between the first and second image is 10 meters.

The position and orientation of the positioning platform and position and orientation of the camera with respect to a reference position and orientation of the positioning platform at the instant of capturing the first and second images are processed to extract radial view parameters which will be the transformation data. The transformation data controls the transformation of the first and second images to first and second radial logarithmic data images. More details about the transformation will be disclosed below. As the size and shape of a perpendicular object in two radial logarithmic data images are similar, a simple scan algorithm, which could be in the form of commonly known pattern matching algorithms, is used to match the similar perpendicular objects in the two radial logarithmic data images.

It has been found that the method according to the invention is able to identify perpendicular planar objects having an angular deviation of +/−10 degrees. The corresponding error in radial logarithmic space is smaller than the noise of the images.

When used in selecting road signs, for example, a size filter is first applied to select only objects that have a real world size which is not smaller than 0.5×0.5 meter nor greater than 1.2×1.2 m. The objects having a size within the desired size range are added to a database for further processing. A perpendicular object of interest could be stored as a small image together with corresponding position assigned to each of the pixels. In an embodiment, the small image comprises the pixels corresponding to the planar object in a source image. The further processing could be the recognition of the type of road sign, the respective signs on a direction signpost or any other type of information that could be extracted from an image or the small image. The information could finally be stored in a map database, which could be used in a navigation system to display on a screen an improved representation of the road in front of the driver or give improved directions based on the information captured from the sign.

In the following paragraphs the transformation will be described in distinguishable sub transformations. It should be noted that the transformation could be performed in one step without the intermediate results that will be described hereafter.

Figure 2A:
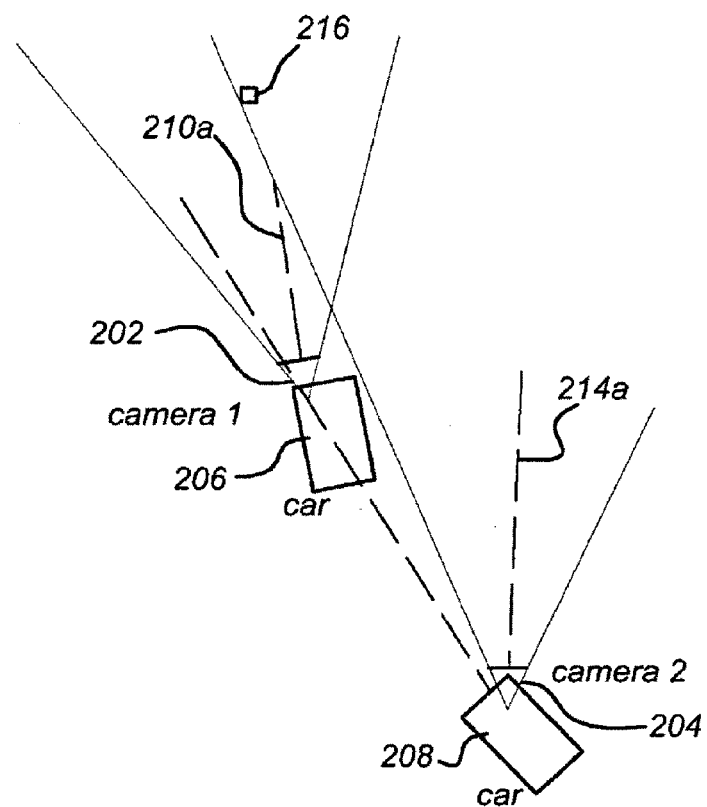
FIG. 2 shows a top view of the general principle of looking axis rotation transformation of source images into images having similar viewing angle.

FIG. 2 shows a top view of the general principle of looking axis rotation transformation of source images into images having a similar looking axis. FIG. 2a shows a first camera 202 and a second camera 204 both mounted on a car 206, 208 observing object 216. The first camera 202 has a first looking axis 210 and the second camera has a second looking axis 214. Both cameras have their respective viewing angles. Both the first and second camera have an object 216 in their viewing angle. The upper picture of FIG. 3 shows a first image with object 310 captured with the first camera and the lower picture of FIG. 3 shows a second image with the same object 312 captured with the second camera. The second image is captured at a distance of 20 meters from the object, while the first image is captured at a distance of 10 meters from the object. This corresponds to the recording of images in mobile mapping vehicles which captures by means of one camera a source image every 10 meters of displacement along the road, wherein the looking axis of the camera is angled with respect to the driving direction.

Figure 2B:
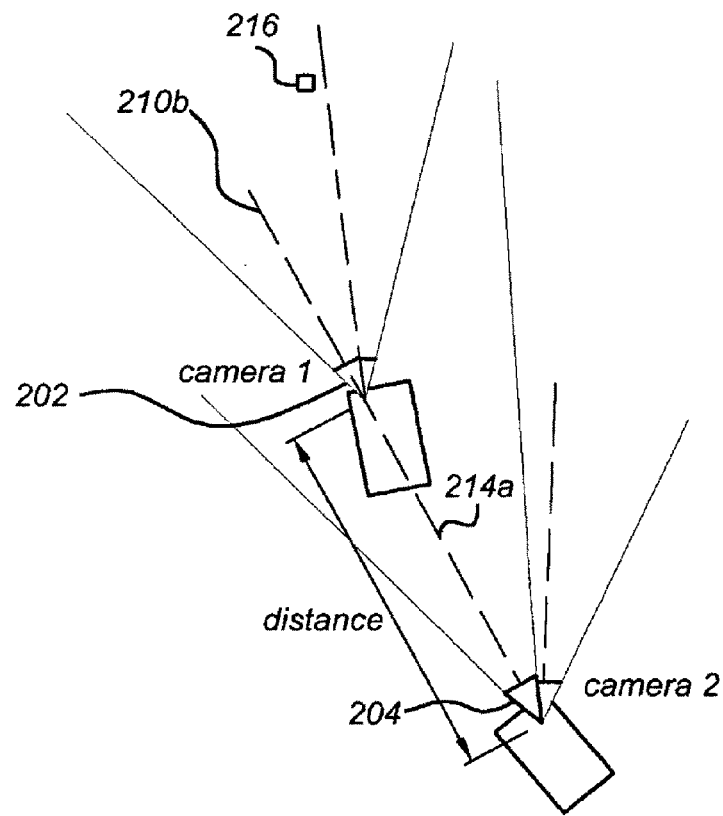
Figure 3:
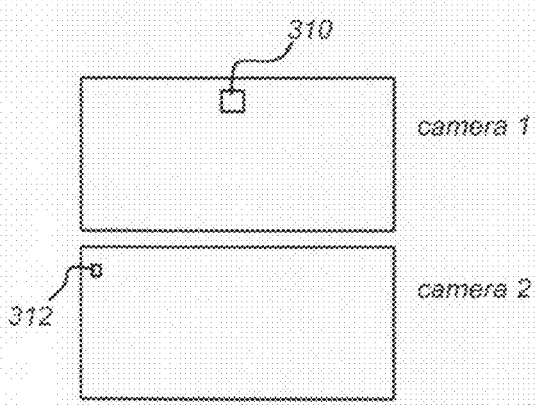
FIG. 3 shows the images of the cameras corresponding to FIG. 2*a;*
Figure 4:
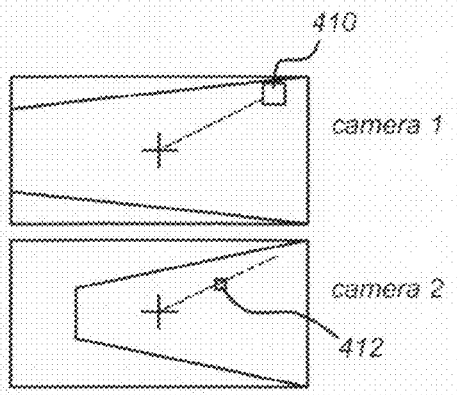
FIG. 4 shows the images of the cameras corresponding to FIG. 2*b;*

FIG. 2b shows the same first camera 202 and second camera 204 observing the object 216. A difference with FIG. 2a is that the looking axis of both the first and second camera have been virtually rotated. The looking axis 214a of the second camera 204 is in line with the looking axis 210b of the first camera 202. The upper picture of FIG. 4 shows a first image with object 410 captured with the first camera 302 having the virtual looking axis and the lower picture of FIG. 4 shows a second image with the same object 412 captured with the second camera 204 with the same virtual looking axis. In both figures the position of the virtual looking axis in the middle of the image is indicated by the cross. The trapezoids in both images indicate the outline of the images in FIG. 3 after virtual rotation transformations of the images.

The virtual looking axis corresponds to the horizontal direction of the road. If the images are recorded by one camera the virtual looking axis could be approximated by the horizontal driving direction of the vehicle when driving from the time instant the first image is captured to the time instant the second image is captured. The rotation of the looking axis for the respective images has to be derived from the orientation data at the same time instants. If the images are captured by two different camera's, the position and orientation data associated to the respective images have to be used to determine the rotation of the looking axis to obtain two virtual looking axes which are parallel with respect to each other and subsequently one of the images has to be translated to bring the position of the virtual looking axis in line with the other. If the position and orientation data generated by the positioning platform in the mobile mapping vehicle is not accurate enough to bring the virtual looking axis in line with each other, the radial logarithmic images will not be accurate enough to enable the scan algorithm to find a match in the first and second radial logarithmic images. It should further be noted that the first and second images could be obtained by two camera's having different viewing angles. In that case, the looking axis rotation transformation should further be arranged to obtain images having the same angular resolution in degrees per pixel.

Figure 5:
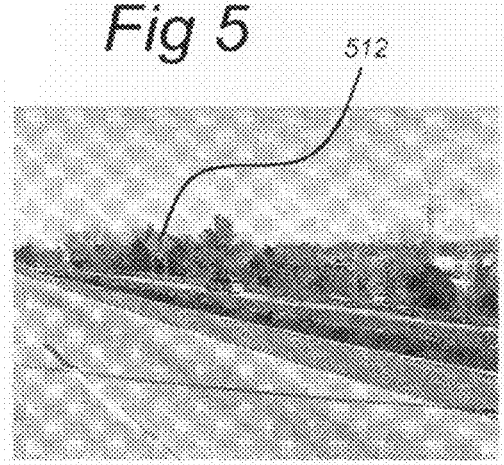
FIG. 5 shows two subsequent source images.

FIG. 5 shows an example of two subsequent images obtained with one camera mounted on a moving vehicle. The lower image is captured first and shows at the left side a road sign 510. The upper image is captured after movement of the vehicle of a specific distance and shows again the road sign 512.

Figure 6:
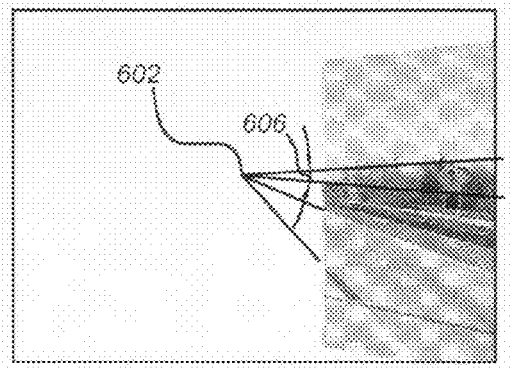
FIG. 6 shows the result of transforming the images of FIG. 5.
Figure 6:
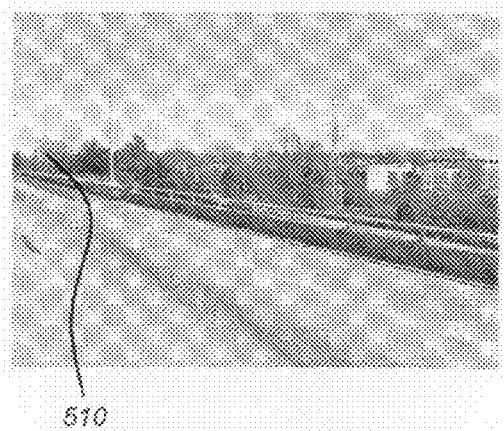
Figure 6:
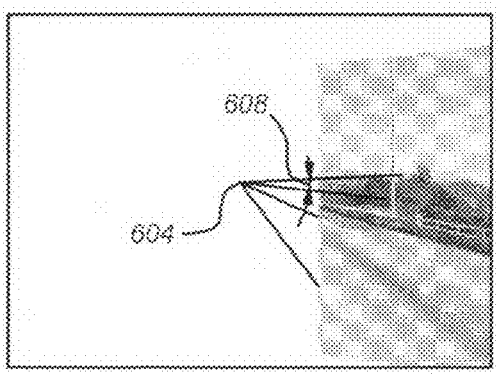

FIG. 6 shows the result of transforming the images of FIG. 5 by virtually rotating the looking axis of the images. In this way two images have been obtained with identical looking axis. The looking axis rotation transformation can be performed by means of the position and orientation data associated with the two images. Furthermore, the position of the looking axis 602, 604 is identical in the images. In the upper and lower image is also indicated the angles 606, 608 formed by the upper pixel and lower pixel of the sign in the image. It can be seen that the angles 606, 608 are similar. It should be noted that the rotation of an image over a defined axis is a build-in function of existing computer graphics cards and therefore no further details are given with respect to the rotation of images to obtain images having an identical looking axis.

Figure 7:
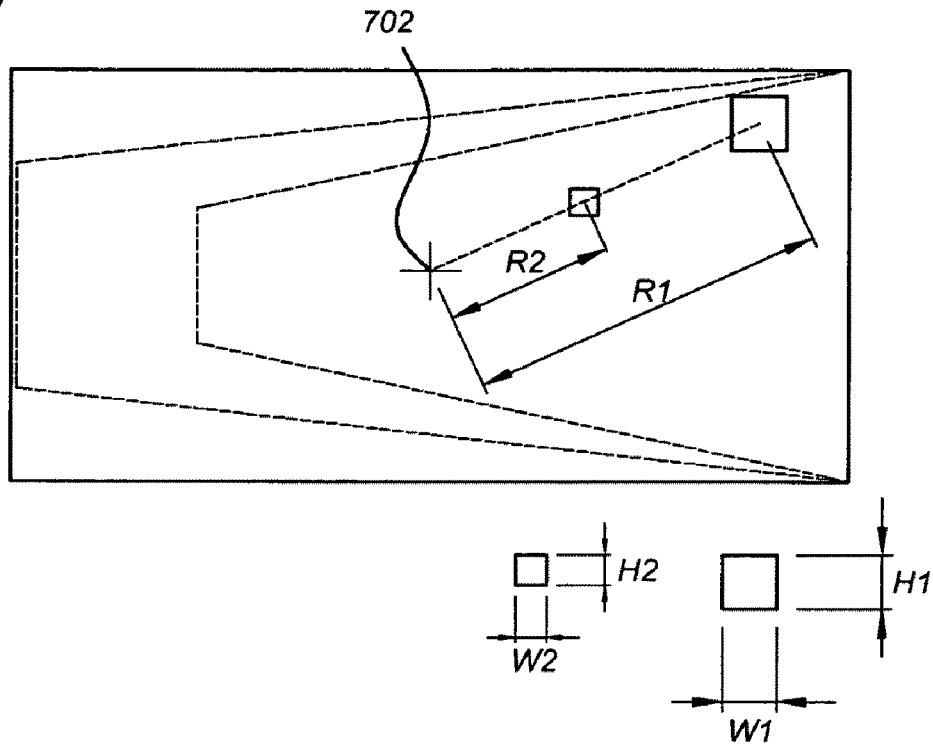
FIG. 7 illustrate characteristics of the transformed images.

FIG. 7 illustrates characteristics of the transformed intermediate images in FIG. 4. FIG. 7 is a combination of the upper and lower image of FIG. 4. The looking axis associated with the first transformed intermediate image and the looking axis associated with the second transformed intermediate image in the images of FIG. 4 are in line. Furthermore, the position of the looking axis in both images is the same. Reference sign 702 indicates the pixel wherein the looking axes associated with both transformed intermediate images cross. Therefore, the images can be combined by overlaying. From said images, it could be said that the first and second transformed intermediate images correspond to images that have been captured by moving the camera along the looking axis. Assume the first transformed intermediate image has been captured at a distance of D1 from the object and the second transformed intermediate image has been captured at two times the distance D1. As a consequence the size H1,W1 of the object in the first transformed intermediate image will be twice the size H2,W2 of the object in the second transformed intermediate image. Furthermore, the distance between the pixel 702, corresponding to the looking axis, and any point of the object in the first transformed intermediate image and the second transformed intermediate image will be doubled R1=2×R2.

Any perpendicular object in the first and second transformed intermediate image will satisfy the following equation:

$$\frac{R_1}{R_2} = \frac{W_1}{W_2} = \frac{H_1}{H_2}$$

wherein:
$R_1$=distance between position of looking axis and position of the object in the first intermediate image;
$R_2$=distance between position of looking axis and position of the object in the second intermediate image;
$W_1$=width of object in first intermediate image;
$W_2$=width of object in second intermediate image;
$H_1$=height of object in first intermediate image;
$H_2$=height of object in second intermediate image.

Furthermore, it can be seen from FIG. 7 that the orientation of the object with respect to the pixel 702 corresponding to the looking axis does not change. As a consequence any pixel of the object in the first image will have an angle or orientation which is equivalent to the angle or orientation in the second image. This is illustrated in FIG. 6. The upper image shows the position of the virtual looking axis 602 and the range 606 of the upper and the lower angle for the upper pixel and lower pixel of the road sign in said image. In the lower figure the position of the virtual looking axis 604 is at the same position as in the upper image. Furthermore, the range 608 of the upper and lower angle for the upper and lower pixel in the lower image is equivalent to the range 606 in the upper image. Therefore, by movement of the camera along the viewing axis only the distance between the pixel of the looking axis and the position of a pixel corresponding to the object will change. An advantage of this feature is that if the size of an object is determined in the first image, the corresponding area of the second image wherein a perpendicular object can be found is known and only said part of the image has to be processed. This reduces the amount of image data to be processed significantly resulting in more efficient processing of the data.

Figure 8:
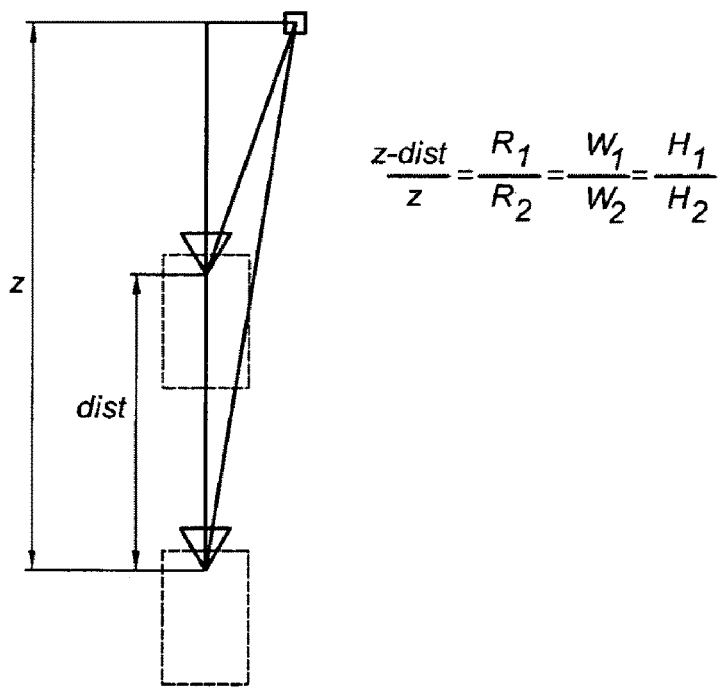
FIG. 8 illustrates a characteristic of the transformation in real world space.

FIG. 8 illustrates another characteristic of the transformation in real world space. Shown is a top view of the camera positions while capturing the first and the second image. It can be seen that in combination of the previous equation the distance z between the camera and the displacement of the camera from the first to the second position satisfies the following equation:

$$\frac{z - dist}{z} = \frac{R_1}{R_2}$$

wherein:
$R_1$=distance between position of looking axis and position of object in first intermediate image;
$R_2$=distance between position of looking axis and position of object in second intermediate image;
z=minimum distance between focal point of camera and plane corresponding to planar object in second intermediate image and;
dist=distance between position of focal point of first intermediate image and second intermediate image.

dist can be measured with a displacement measuring device, for example a wheel sensor.

Potential objects in the intermediate images could be obtained by segmenting the images on the basis of color information. However, it seems more than complicated;

rather impossible, to measure in the intermediate images for every potential object the radius proportions as well as width and height of the potential objects. Therefore, a transformation has been looked for which advantageously uses the characteristics of the intermediate images having the same looking axis. The radial logarithmic transformation has these advantages. For every pixel in the image the distance R between the pixel corresponding to the looking axis and said pixel will be determined and subsequently the logarithmic value will be determined.

Figure 9:
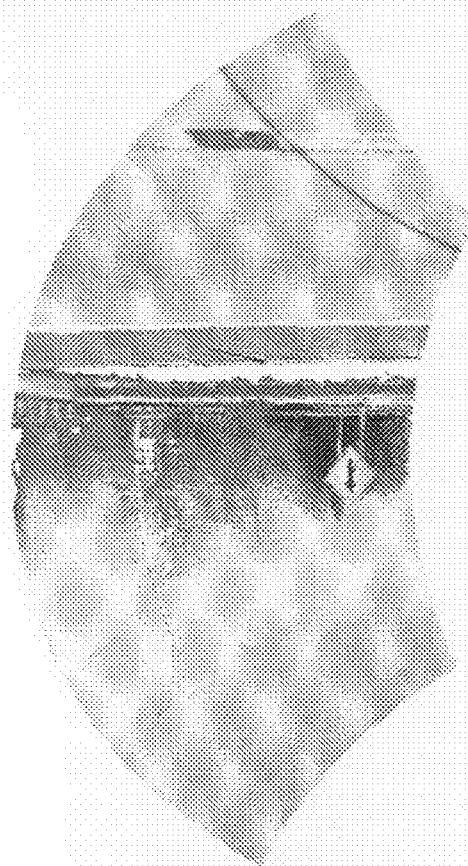
FIG. 9 shows the result of applying the radial logarithmic transformation on the image of FIG. 6.
Figure 9:
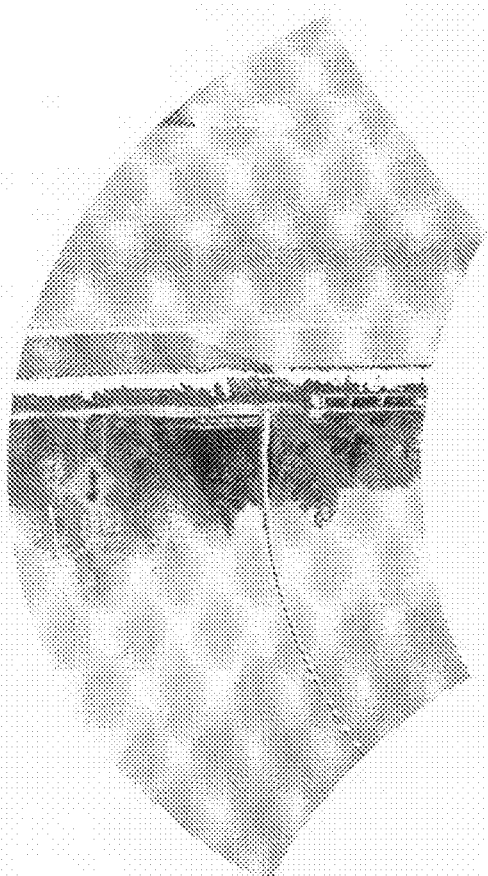
Figure 9:
Figure 9:
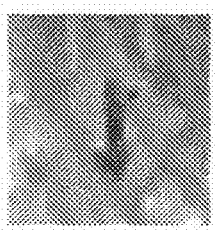

In the radial logarithmic space the x-axis corresponds to the logarithmic value of the distance between the pixel (a,b) corresponding to the looking axis and a pixel (x,y) in the intermediate image. The y-axis corresponds to the angle of the line through the pixel (a,b) of the looking axis and the pixel (x,y). As said before, a characteristic of a perpendicular object in the intermediate first and second image is that the angle with respect to the looking axis pixel does not change. Consequently, in radial logarithmic space, the position of the object with respect to the y-axis does not change. Furthermore, the distance in real world between the object and camera is inversely proportional to the size in the intermediate image. By applying the logarithmic function on the radius R the size and shape of an object in radial logarithmic space is independent of the distance between the camera and the perpendicular object. FIG. 9 shows the result of applying the radial logarithmic transformation on the image of FIG. 6. At the right hand size an enlarged view of the road sign in the corresponding figure is shown. It can be seen that the shape and size of the object in radial logarithmic space is similar irrespective the distance between the camera and perpendicular planar object. Therefore in the radial logarithmic space objects of interest can be detected by simple pattern matching algorithms.

The horizontal displacement between the objects in the first and second radial logarithmic images, this is the displacement along the x-axis in number of pixels, is proportional to the change in distance between the focal point of the camera and the object when recording the first and second source images.

The method described above is not applied on whole images but on candidate segments. The candidate segments are obtained by segmenting the images in segments with similar color. Technical report Road Sign Recognition by Lalonde Marc and Li Ying., Centre de recherche informatique de Montreal, 1995. Survey of the State of the Art for Sub-Project 2.4, CRIM/IIT describes the state of the art in the sub-domain of pattern recognition that is related to analysis and recognition of road signs from color images by CCD cameras. This document mentions a variety of algorithms for the detection of signage via color segmentation and shape recognition. Each of the candidate segments corresponds to a group of pixels of an image that is potentially an object.

A candidate segment of a first intermediate image is transformed to a first radial logarithmic image. From the description above, we have learned that when a camera is moved along its looking axis, the angle formed by the position of the looking axis, the upper pixel and lower pixel of an object in the intermediate images will not change. Therefore, as we assume that the camera is moved along the looking axis, only the part of a second intermediate image, within the angle of the candidate segment has to be transformed to a second radial logarithmic image. The second intermediate image has been obtained by rotating the source image which precedes the source image corresponding to the candidate segment. Therefore the first and second radial logarithmic image will have the same height. Subsequently, the first radial logarithmic image, which corresponds to the pixels of the candidate segment, is scanned horizontally along that part of the second radial logarithmic image that was appropriate to compute. This embodiment assumes that the source images have been captured by the same camera, but at different positions, wherein the cameras captures the road in front of the vehicle. Furthermore, the looking axis of the source images is not similar to the driving direction. In the first intermediate image the object to be detected will have a larger size than in the second intermediate image. The radial logarithmic space transformation is only applied to the pixels of a segment of the first intermediate image and the part of the second intermediate image wherein the segment could be present. Both measures significantly decrease the computing power required for the radial logarithmic space transformation. The above implies that the first source image is captured in time after the second source image.

A simple scan algorithm is used to verify object detection and determine the displacement along the x-axis between the first and second radial logarithmic images. The scan algorithm determines the rgb difference between the object as identified in the first logarithmic image and every possible horizontal displacement (offset), in terms of number of pixels, in the second radial logarithmic image. An example of the rgb difference is the sum of the squared distance between pixels in rgb space. The squared distance between pixels can be determined by the following equation:

$$\text{squared\_dist} = \text{sum} \left( (r1-r2)^2 + (g1-g2)^2 + (b1-b2)^2 \right)$$

wherein:

r1 and r2 are the values of the red component of the pixels in the first and second radial logarithmic image respectively, g1 and g2 are the values of the green component of the pixels in the first and second radial logarithmic image respectively, and b1 and b2 are the values of the blue component of the pixels in the first and second radial logarithmic image respectively.

Sum is taken over all selected pixels comprising the object in the first radial logarithmic image and their counterpart in the second radial logarithmic image.

The scan algorithm can be described by the following pseudo code:

```
bestfit = Not A Number;
minSum = MAX_NUMBER;
for each potential offset o do:
    sum = 0;
    for each point x,y in mask of object do:
        sum = sum+dist(rgb1(x,y),rgb2(x+o,y))
    if (sum < minSum)
        bestfit =o;
        minSum=sum;
``` wherein rgb1(x,y) and rgb2(x+o,y) are the values of a pixel in the first and second radial logarithmic image at position x,y and x+o,y respectively.

After execution of such an algorithm, the value of "bestfit" will be the value of the best match.

By scanning the second radial logarithmic image, with the first radial logarithmic image, which corresponds to the candidate segment, the most likely position of the candidate segment in the second radial logarithmic image could be detected. The scan algorithm generates a correlation output by analyzing the Cartesian distance in rgb space for each assumed horizontal displacement in the radial logarithmic image. The position which has the minimal value of the correlation output corresponds to the position where the highest correlation between the pixels of the candidate segment and the pixels of the second radial logarithmic images is achieved. However, if the first radial logarithmic image corresponds to a moving object, the object will not be present or at least not fully be present with the same size and shape in the second logarithmic image. The scan algorithm will not generate a correlation output with a relatively low value, which indicates that there is no position with correlation between the pixels of the candidate segment and the pixels of the second radial logarithmic image. To reduce false positives, a predetermined threshold value is used to check the minimal value of the correlation output. If the minimal value is smaller than the predetermined threshold value, the candidate segment is regarded to have a match with an area in the second radial logarithmic image, and consequently is concluded that the candidate segment is a stationary plane perpendicular to the driving direction of the vehicle.

Figure 10:
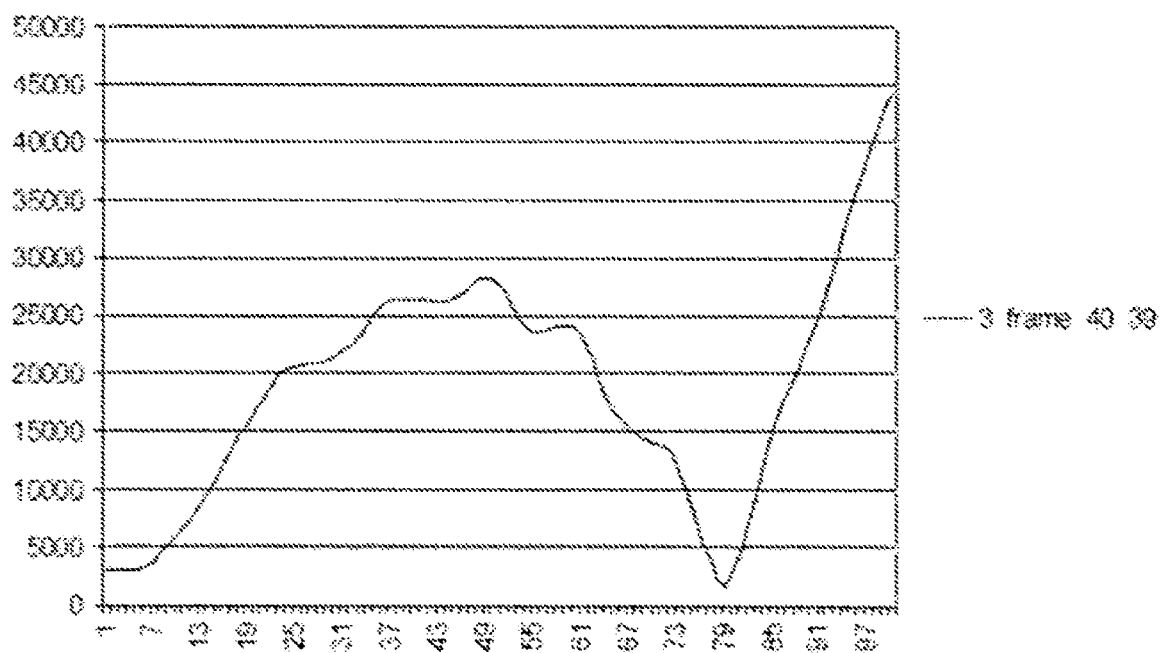
FIG. 10 shows a correlation function output.

FIG. 10 shows a correlation function output obtained by performing a scan algorithm. The X-axis represents the horizontal displacement of the candidate segment with respect to the position in the second radial logarithmic image and the y-axis represents the Cartesian distance value. It can be seen that at a horizontal displacement of 79 a minimum in Cartesian distance value is found. This correspond to the point wherein the highest correlation between the candidate segment and the second logarithmic image is achieved.

To verify that the candidate segment corresponds to an object perpendicular to the looking axis, the first radial logarithmic image is equally divided into at least two parts, for example a left and right part. For each of the parts again the correlation function output is determined. If the object is perpendicular the horizontal displacement will be the same for both parts. However, if the object does not have a perpendicular surface, the horizontal displacement of the left part and the right part will differ. If this test is positive, we conclude that the object has a flat surface perpendicular to the looking axis of the first and second intermediate image.

The horizontal displacement (offset) of the candidate image in the first and second radial logarithmic image is a measure to calculate the distance between the camera and the perpendicular object.

Figure 11:
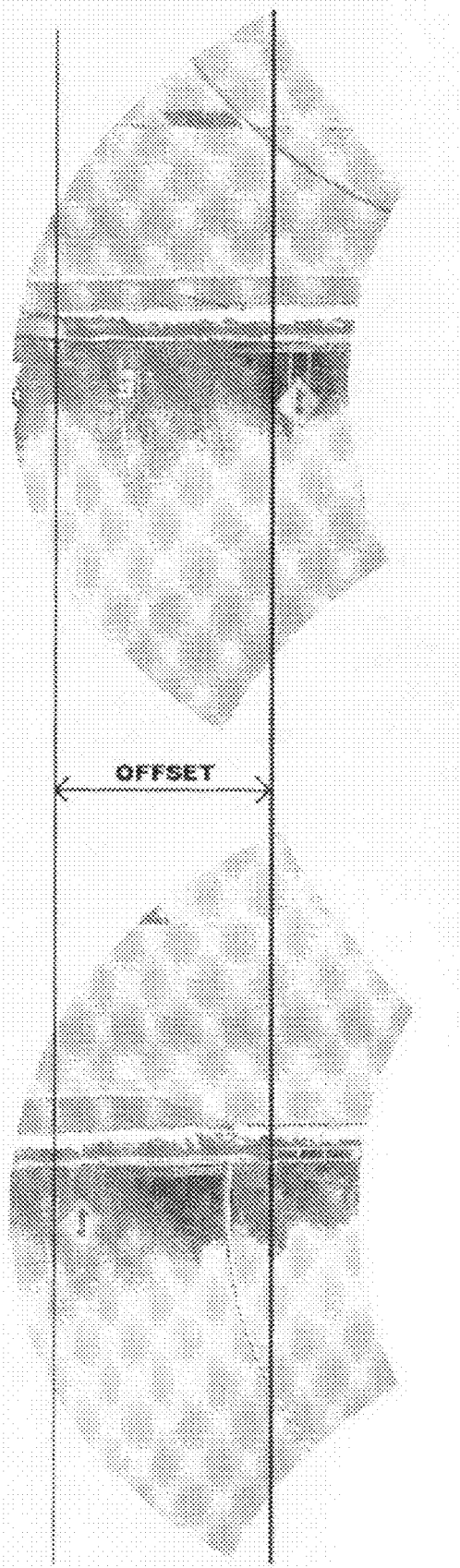
FIG. 11 illustrates in radial logarithmic space of fully transformed images the displacement between the position of a road sign in the first radial logarithmic image and the detected position in the second logarithmic image.

FIG. 11 illustrates in radial logarithmic space of fully transformed images the displacement between the position of a road sign in the first radial logarithmic image and the detected position in the second logarithmic image.

To calculate the object distance from the camera, z in FIG. 8, we use the following equation:

$$z = -\frac{dist}{e^{\text{offset} \frac{\log(\text{width})}{\log(e)\text{width}}} - 1}$$

Where:
z—distance between focal point of camera and intersection of looking axis and plane corresponding to planar object in second intermediate image
width—log space image width,
dist—distance between two camera positions in real world,
offset—horizontal displacement between object locations in radial logarithmic image space, in other words-how many pixels difference is there from the object in the first radial-log image to the object found in the second radial-log frame.

For example, dist=10, width of radial logarithmic image is 3000 pixels, and an offset of −80, we can calculate that object's distance from the camera to be 52.015 m.

Having z calculated we can use the perspective equation to calculate the object's position:

$$XCam = \frac{z}{fpx}\left(x_S - \frac{\text{width}}{2}\right)$$

$$ZCam = \frac{z}{fpx}\left(y_S - \frac{\text{height}}{2}\right)$$

Wherein:
XCam—horizontal position of object in intermediate image with respect to pixel corresponding to looking axis;
ZCam—vertical position of object in intermediate image with respect to pixel corresponding to looking axis;
z—previously calculated (radial-logarithmic space)
width—original frame image width
height—original frame image height
$x_S$—object's x coordinate in frame axis
$y_S$—object's y coordinate in frame axis
fpx—focal length of camera in pixels Now we have XCam, ZCam and z, which are the objects' coordinates in camera space. The final step is the transformation from camera to real world coordinates to have the object's final position $(x_p, y_p, z_p)$ in a coordinate reference system, such as WGS84.

Figure 12:
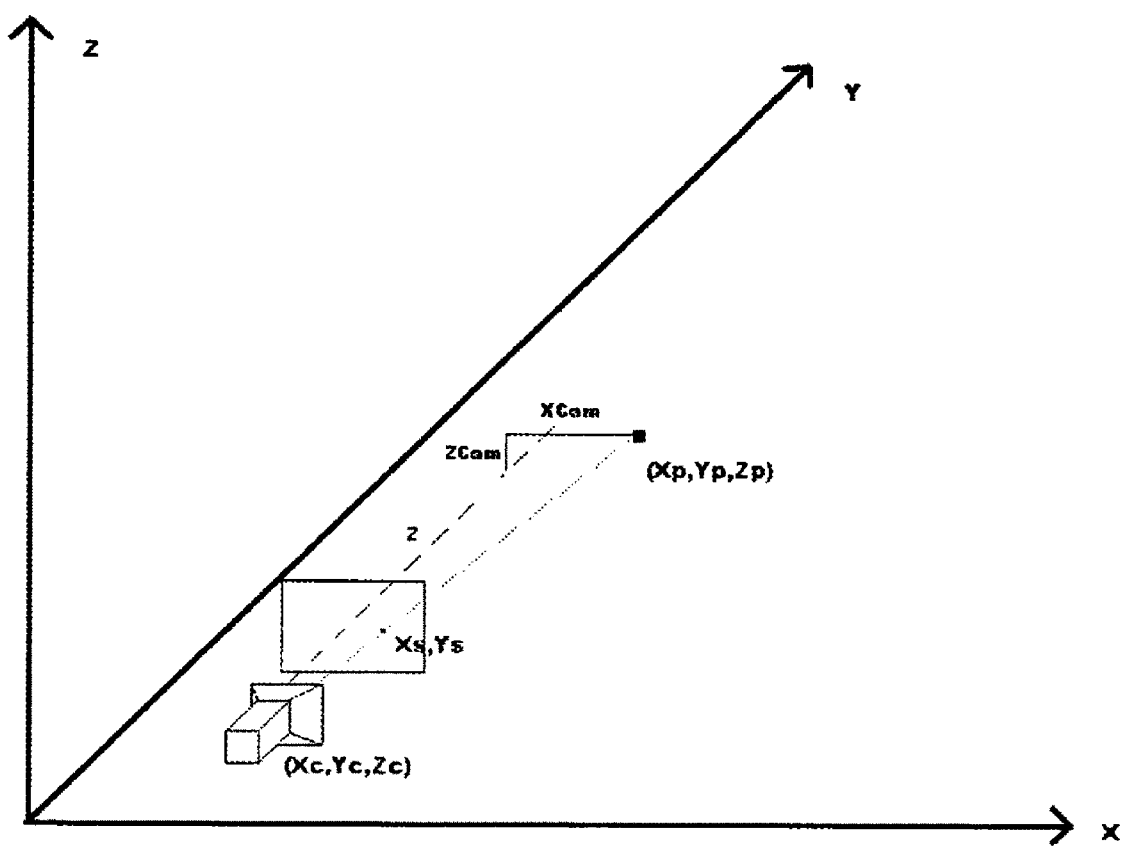
FIG. 12 illustrates the transformation from image space to world coordinates.

FIG. 12 illustrates the transformation from image space to world coordinates.

(Xc, Yc, Zc) is the real world position of the camera, Xs, Ys is the position of the candidate segment in the intermediate image space and (Xp, Yp, Zp) is the final object's position in world coordinates.

The object's position in world coordinates is in an embodiment used to determine whether the planar objects have a position in a predefined road corridor and subsequently have to be stored in a map database. An example of such a predefined road corridor might be:
all objects having a position which are not further than 10 m to the left and/or to the right of the position of the mobile mapping vehicle;
all objects having a position which are above 0.5 m and/or below 6.0 m height above the road surface;
all objects having a position which are in the range of 0.5-30 m distance in front of the camera.

In stead of the world coordinates, also relative coordinates, for example relative to the position of the vehicle, could be used to select which objects has to be stored in a map database. Applying this position selection improves the false positive rate of the method according to the invention.

The segmentation of the images into candidate segments has the advantage that a minimum amount of pixels in the first and second images is used to perform the method according to the invention. Only the pixels of a candidate segment are transformed to obtain the first radial logarithmic image. Furthermore, only the part of the image where a perpendicular object could be is transformed to the second logarithmic image. These measurements improve the processing speed for executing the method according to the invention and to detect perpendicular planar objects.

Figure 13:
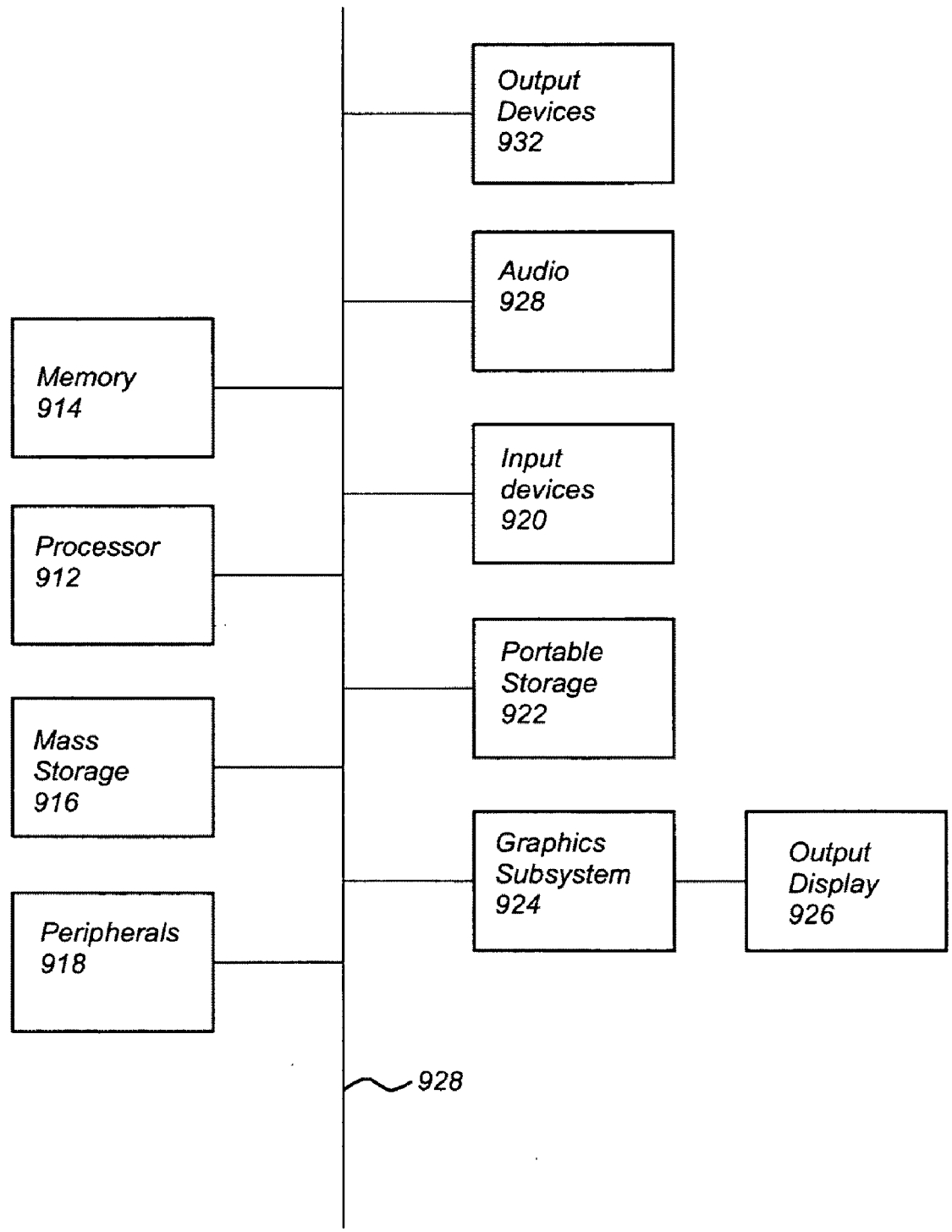
FIG. 13 is a block diagram of an exemplar hardware system for implementing the method according to the invention.

FIG. 13 illustrates a high level block diagram of a computer system which can be used to implement the method of identifying and determining the position of a planar object described above. The computer system could further be arranged for capturing characteristics of the planar object. In the field of collecting vertical road information the characteristics could be the size and type of a road, the directions on a route sign and corresponding position on the route sign, city names, etc. Technical report Road Sign Recognition by Lalonde Marc and Li Ying., Centre de recherche informatique de Montreal, 1995. Survey of the State of the Art for Sub-Project 2.4, CRIM/HT describes the state of the art in the sub-domain of pattern recognition that is related to analysis and recognition of road signs from color images by CCD cameras. This document mentions a variety of algorithms for the capturing of characteristics of signage. The computer system is further arranged to store the characteristics and position of the planar object on a storage medium for use in a map database.

The computer system of FIG. 13 includes a processor unit 912 and main memory 914. Processor unit 912 may contain a single microprocessor, or may contain a plurality of microprocessors for configuring the computer system as a multi-processor system. Main memory 914 stores, in part, instructions and data for execution by processor unit 912. If the method of the present invention is wholly or partially implemented in software, main memory 914 stores the executable code when in operation. Main memory 914 may include banks of dynamic random access memory (DRAM) as well as high speed cache memory.

The system of FIG. 9 further includes a mass storage device 916, peripheral device(s) 918, input device(s) 920, portable storage medium drive(s) 922, a graphics subsystem 924 and an output display 926. For purposes of simplicity, the components shown in FIG. 9 are depicted as being connected via a single bus 928. However, the components may be connected through one or more data transport means. For example, processor unit 912 and main memory 914 may be connected via a local microprocessor bus, and the mass storage device 916, peripheral device(s) 918, portable storage medium drive(s) 922, and graphics subsystem 924 may be connected via one or more input/output (I/O) buses. Mass storage device 916, which may be implemented with a magnetic disk drive or an optical disk drive, is a non-volatile storage device for storing data, such as the geo-coded image sequences of the respective cameras, calibration information of the cameras, constant and variable position parameters, constant and variable orientation parameters, intermediate images, a database with detected objects and instructions for use by processor unit 912. In one embodiment, mass storage device 916 stores the system software or computer program for implementing the present invention for purposes of loading to main memory 914.

Portable storage medium drive 922 operates in conjunction with a portable non-volatile storage medium, such as a floppy disk, micro drive and flash memory, to input and output data and code to and from the computer system of FIG. 9. In one embodiment, the system software for implementing the present invention is stored on a processor readable medium in the form of such a portable medium, and is input to the computer system via the portable storage medium drive 922. Peripheral device(s) 918 may include any type of computer support device, such as an input/output (I/O) interface, to add additional functionality to the computer system. For example, peripheral device(s) 918 may include a network interface card for interfacing computer system to a network, a modem, etc.

Input device(s) 920 provide a portion of a user interface. Input device(s) 920 may include an alpha-numeric keypad for inputting alpha-numeric and other key information, or a pointing device, such as a mouse, a trackball, stylus, or cursor direction keys. In order to display textual and graphical information, the computer system of FIG. 9 includes graphics subsystem 924 and output display 926.

Output display 926 may include a cathode ray tube (CRT) display, liquid crystal display (LCD) or other suitable display device. Graphics subsystem 924 receives textual and graphical information, and processes the information for output to display 926. Output display 926 can be used to report intermediate results, display objects found, display confirming information and/or display other information that is part of a user interface. The system of FIG. 9 also includes an audio system 928, which includes a microphone. In one embodiment, audio system 928 includes a sound card that receives audio signals from the microphone. Additionally, the system of FIG. 9 includes output devices 932. Examples of suitable output devices include speakers, printers, etc.

The components contained in the computer system of FIG. 9 are those typically found in general purpose computer systems, and are intended to represent a broad category of such computer components that are well known in the art.

Thus, the computer system of FIG. 9 can be a personal computer, workstation, minicomputer, mainframe computer, etc. The computer can also include different bus configurations, networked platforms, multi-processor platforms, etc. Various operating systems can be used including UNIX, Solaris, Linux, Windows, Macintosh OS, and other suitable operating systems.

The method described above could be performed automatically. It might happen that the images are such that image processing tools and object recognition tools need some correction. For example the correlation function shows at more than one position a maximal correlation. In that case the method includes some verification and manual adaptation actions to enable the possibility to confirm or adapt intermediate results or select visually the best position. These actions could also be suitable for accepting intermediate results or the final result of the planar object detection.

It should further be noted, that using first and second source images captured at different time instants, has the advantage that moving planar objects, such as the number plate at the back of a moving vehicle, will almost never be detected as planar objects by the method according to the invention.

The presented method is very suitable for a method of producing planar road information for use in a map database. The method according to the invention identifies areas in the source images as planar objects. After identification, the areas of pixels of the identified objects in the source images or the whole source images could be stored together with the x,y position of the area in the source image and position and orientation data associated with the source image. The x,y position of an area of a planar object in two source images taken at different locations in a coordinate reference system, together with the position and orientation data associated with said to images, enable us to determine the position of the object in the coordinate reference system. Furthermore, the images of the objects could be used to detect the type of road information. Moreover, optical character recognition (OCR) or intelligent character recognition (ICR) software could be used to detect the textual information on a road sign. This information could be stored together with the position information of the sign in a memory. It should be noted that the position information should not always be expressed as coordinates in a coordinate reference system but could also be in the form of a reference to for example a specific junction on a highway. In that case, a match have to be made with the actual position and the junction. This could be done by software or manually.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. Method of identifying a planar object in source images comprising:
   retrieving a first source color image obtained by a first terrestrial based camera;
   retrieving a second source color image obtained by a second terrestrial based camera;
   retrieving position data associated with the retrieved first and second source images;
   retrieving orientation data associated with the retrieved first and second source images;
   performing a combined looking axis rotation transformation and radial logarithmic space transformation on at least a part of the retrieved first and second source images by use of the retrieved associated position data and orientation data to obtain first and second radial logarithmic data images wherein the looking axis rotation transformation corresponds to transforming the retrieved first and second source images into first and second intermediate images representing images having an identical looking axis;
   performing a pattern matching algorithm to detect an area having similar dimensions in the obtained first and second radial logarithmic data images, wherein the performing of the pattern matching algorithm comprises:
      scanning the second radial logarithmic data image with the area of a potential object from the first radial logarithmic data image to determine the rgb difference between the potential object from the first radial logarithmic data image at a plurality of horizontal displacements in the second radial logarithmic data image; and
      determining the horizontal displacement with the minimal rgb difference; and
   identifying the detected area as a planar object and computing the position of the planar object based on the determined horizontal displacement and the retrieved associated position data and orientation data.

2. Method according to claim 1, further comprising:
   detecting a part of the first source image or first intermediate image corresponding to a potential planar object, wherein the first radial logarithmic data image have been obtained by performing a logarithmic space transformation on a part of the second intermediate image, and wherein the part is defined by the position of the looking axis in the second intermediate image and the corresponding part of the first intermediate image corresponding to the potential planar object.

3. Method according to claim 1, wherein properties of an identified planar object in the first and second intermediate images satisfy the following equation:

$$\frac{R_1}{R_2} = \frac{W_1}{W_2} = \frac{H_1}{H_2}$$

wherein:
   $R_1$=distance between a position of looking axis and a position of object in first intermediate image;
   $R_2$=distance between a position of looking axis and a position of object in second intermediate image;
   $W_1$=width of an object in first intermediate image;
   $W_2$=width of an object in second intermediate image;
   $H_1$=height of an object in first intermediate image; and
   $H_2$=height of an object in second Intermediate image.

4. Method according to claim 1, wherein the performing of the pattern matching algorithm comprises:
   dividing the area of a potential object into at least two parts; and,
   for each of the at least two parts, scanning the second radial logarithmic data image with the area of the part from the first radial logarithmic data image to determine the rgb difference between the part from the first radial logarithmic data at a plurality of horizontal displacements in the second radial logarithmic data image, and determining the horizontal displacement with the minimal rgb difference; and
   verifying whether the determined horizontal displacement of each of the at least two parts is similar.

5. Method according to claim 1, wherein an area is identified as a planar object if the minimal rgb difference between the area of a potential object of the first radial logarithmic data image and the second radial logarithmic data image is smaller than a threshold.

6. Method according to claim 1, wherein computing the position of the planar object performs the equation:

$$z = -\frac{dist}{e^{offset \frac{log(width)}{log(e)width}} - }$$

where:
   z is a distance between a focal point of camera and an intersection of looking axis and plane corresponding to a planar object in the second intermediate image,
   width is a log space image width,
   dist is a distance between two camera positions in real world, and
   offset is a horizontal displacement between object locations in radial logarithmic image space.

7. An apparatus for identifying and determining the a position of a planar object from source images for use in a map database, the apparatus comprising:
   a processor readable storage medium; and
   a processor in communication with said processor readable storage medium,
   said processor readable storage medium storing code to program said processor to:
   retrieve a first color source image obtained by a first terrestrial based camera;
   retrieve a second color source image obtained by a second terrestrial based camera;
   retrieve position data associated with the retrieved first and second source images;
   retrieve orientation data associated with the retrieved first and second source images;
   perform a combined looking axis rotation transformation and radial logarithmic space transformation on at least a part of the retrieved first and second source images by use of the associated position data and orientation data to obtain first and second radial logarithmic data images, wherein the looking axis rotation transformation corresponds to transforming the retrieved first and second source images into first and second intermediate images representing images having an identical looking axis;
   perform a pattern matching algorithm to detect an area having similar dimensions in the obtained first and second radial logarithmic data images, wherein the performing of the pattern matching algorithm comprises:
  scanning the second radial logarithmic data image with the area of a potential object from the first radial logarithmic data image to determine the rgb difference between the potential object from the first radial logarithmic data image at a plurality of horizontal displacements in the second radial logarithmic data image; and
  determining the horizontal displacement with the minimal rgb difference; and
identify the detected area as a planar object;
capture characteristics of the identified planar object;
determine the position of the identified planar object by use of the determined horizontal displacement and the retrieved associated position and orientation data; and
store the captured characteristics and determined position on a storage medium for use in a map database.

8. Method according to claim 2, wherein properties of an identified planar object in the first and second intermediate images satisfy the following equation:

$$\frac{R_1}{R_2} = \frac{W_1}{W_2} = \frac{H_1}{H_2}$$

wherein:
  $R_1$=distance between a position of looking axis and a position of object in first intermediate image;
  $R_2$=distance between a position of looking axis and a position of object in second intermediate image;
  $W_1$=width of an object in first intermediate image;
  $W_2$=width of an object in second intermediate image;
  $H_1$=height of an object in first intermediate image; and
  $H_2$=height of an object in second Intermediate image.

9. A non-transitory computer readable medium including program segments for, when executed on a computer device, causing the computer device to implement the method of claim 1.

* * * * *